United States Patent
Cordes et al.

(10) Patent No.: US 10,424,185 B2
(45) Date of Patent: Sep. 24, 2019

(54) RESPONDING TO PERSONAL DANGER USING A MOBILE ELECTRONIC DEVICE

(71) Applicant: International Business Machines Corporation, Armonk, NY (US)

(72) Inventors: Steven A. Cordes, Yorktown Heights, NY (US); Michael S. Gordon, Yorktown Heights, NY (US); Nigel Hinds, Great Barrington, MA (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/816,799

(22) Filed: Nov. 17, 2017

(65) Prior Publication Data

US 2019/0156655 A1    May 23, 2019

(51) Int. Cl.
*G08B 25/01* (2006.01)
*G08B 25/00* (2006.01)
(Continued)

(52) U.S. Cl.
CPC ......... *G08B 25/016* (2013.01); *G08B 25/001* (2013.01); *G08B 25/006* (2013.01); *G08B 25/10* (2013.01); *G06N 20/00* (2019.01); *H04W 4/12* (2013.01); *H04W 4/90* (2018.02); *H04W 40/24* (2013.01); *H04W 64/00* (2013.01)

(58) Field of Classification Search
CPC .. G08B 25/016; G08B 25/001; G08B 25/006; G08B 25/10; G06N 99/005; H04W 4/22; H04W 4/028; H04W 4/90; H04W 8/22
See application file for complete search history.

(56) References Cited

U.S. PATENT DOCUMENTS 8,552,855 B2   10/2013   Herickhoff et al.
8,630,820 B2    1/2014   Amis
(Continued)

OTHER PUBLICATIONS

Freudiger, Julien, "Short: How Talkative is your Mobile Device? An Experimental Study of Wi-Fi Probe Requests", Proc. ACM Conf. on Security & Privacy in Wireless and Mobile Networks, n. 8 (2015).
(Continued)

*Primary Examiner* — Adnan Aziz
(74) *Attorney, Agent, or Firm* — Diana R. Gerhardt; Jack V. Musgrove

(57) ABSTRACT

A mobile electronic device such as a smartphone is used in conjunction with a deep learning system to detect and respond to personal danger. The deep learning system monitors current information (such as location, audio, biometrics, etc.) from the smartphone and generates a risk score by comparing the information to a routine profile for the user. If the risk score exceeds a predetermined threshold, an alert is sent to the smartphone which presents an alert screen to the user. The alert screen allows the user to cancel the alert (and notify the deep learning system) or confirm the alert (and immediately transmit an emergency message). Multiple emergency contacts can be designated, e.g., one for a low-level risk, another for an intermediate-level risk, and another for a high-level risk, and the emergency message can be sent to a selected contact depending upon the severity of the risk score.

20 Claims, 8 Drawing Sheets

(51) Int. Cl.
*G08B 25/10* (2006.01)
*G06N 20/00* (2019.01)
*H04W 64/00* (2009.01)
*H04W 4/12* (2009.01)
*H04W 40/24* (2009.01)
*H04W 4/90* (2018.01)

(56) References Cited

U.S. PATENT DOCUMENTS

| | | | |
|---|---|---|---|
| 8,866,606 B1 * | 10/2014 | Will | G08B 25/005 |
| | | | 340/539.11 |
| 9,369,500 B2 * | 6/2016 | Sandblad | H04L 65/1059 |
| 9,380,429 B1 * | 6/2016 | Kurani | G06Q 50/265 |
| 9,552,548 B1 * | 1/2017 | Brestoff | G06N 3/08 |
| 9,615,235 B2 | 4/2017 | Scully et al. | |
| 9,805,585 B1 * | 10/2017 | Geller | G08B 25/016 |
| 9,836,944 B2 * | 12/2017 | Hwang | H04W 4/90 |
| 9,846,999 B1 * | 12/2017 | Pickover | H04W 4/02 |
| 10,037,668 B1 | 7/2018 | DesGarennes | G08B 21/0423 |
| 2009/0128320 A1 * | 5/2009 | Needham | G08B 25/014 |
| | | | 340/504 |
| 2010/0297980 A1 * | 11/2010 | Alberth | H04M 1/72536 |
| | | | 455/404.2 |
| 2011/0099281 A1 * | 4/2011 | Bakker | H04M 3/42348 |
| | | | 709/228 |
| 2013/0229282 A1 * | 9/2013 | Brent | H04M 3/42382 |
| | | | 340/540 |
| 2014/0187213 A1 * | 7/2014 | Shuster | H04W 4/023 |
| | | | 455/414.1 |
| 2014/0364081 A1 * | 12/2014 | Rauner | H04L 12/1895 |
| | | | 455/404.2 |
| 2015/0245189 A1 | 8/2015 | Nalluri et al. | |
| 2015/0254555 A1 * | 9/2015 | Williams, Jr. | G06N 3/0454 |
| | | | 706/14 |
| 2015/0365796 A1 | 12/2015 | Toni | |
| 2016/0027292 A1 | 1/2016 | Kerning | |
| 2016/0163174 A1 * | 6/2016 | Zhang | G08B 21/0438 |
| | | | 340/539.12 |
| 2016/0345150 A1 * | 11/2016 | Shim | H04W 4/90 |
| 2017/0193785 A1 * | 7/2017 | Remer | G08B 25/016 |
| 2018/0053394 A1 * | 2/2018 | Gersten | H04N 9/8205 |

OTHER PUBLICATIONS

IPCOM, "Personal Safety Indicator", Published by IP.com as publication No. IPCOM000240833D (2015).

* cited by examiner

RESPONDING TO PERSONAL DANGER USING A MOBILE ELECTRONIC DEVICE

CROSS-REFERENCE TO RELATED APPLICATION

This application is related to U.S. patent application Ser. No. 15/816,771 entitled "DETECTING PERSONAL DANGER USING A DEEP LEARNING SYSTEM" filed concurrently herewith, which is hereby incorporated.

BACKGROUND OF THE INVENTION

Field of the Invention

The present invention generally relates to systems for personal security, and more particularly to a method of using a deep learning system to detect personal danger.

Description of the Related Art

A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feedforward neural network based on animal visual perception, and so is particularly useful in processing image data. Convolutional neural networks are similar to ordinary neural networks but are made up of neurons that have learnable weights and biases.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

For urban areas in particular, as population densities grow and social events create more gatherings, it becomes more likely that dangerous situations can occur, whether of an accidental or intentional nature. Attempts have been made to provide individuals with security and safety devices to guard against such instances. For example, special blue lights on college campuses are becoming ubiquitous. If someone feels threatened, they can run to the blue light and push an alarm button to alert the campus police who are supposed to respond quickly.

Software applications ("apps") have also been devised for smartphones and other mobile electronic devices that allow a user to manually request emergency intervention. Some apps can be activated using a voice command, such as when the user says "Dial 9-1-1" and the smartphone detects this speech, parses it's meaning, and then automatically initiates a phone call to local emergency services.

There are also apps that allow someone to monitor the location and movements of another, such as a parent who wants to keep track of a child. The child's smartphone can regularly transmit location information such as GPS coordinates to a monitoring station or to the parent's smartphone, which can use navigation (mapping) software to determine particular locales the child has visited or routes the child has taken. Boundaries can be set such that if the child's smartphone travels outside of a designated area, an alert is automatically sent to the parent.

SUMMARY OF THE INVENTION

The present invention in at least one embodiment is generally directed to a method of responding to personal danger using a mobile electronic device by designating an emergency contact for a user of the mobile electronic device, transmitting current environmental information from the mobile electronic device to a deep learning system having a routine profile of the user, receiving at the mobile electronic device a risk alert from the deep learning system indicative of personal danger based on the current environmental information as compared to the routine profile, and responsively generating an alert screen on a display of the mobile electronic device wherein the alert screen includes an alarm input object and a safe input object, the alarm input object allowing the user to immediately transmit an emergency message to the emergency contact, and the safe input object allowing the user to cancel the risk alert. The alert screen can further include a warning indicating the emergency message is to be transmitted to the emergency contact when a timer countdown reaches zero. If the user cancels the alert via the safe input object, the alert screen will be removed from the display and a cancel signal will be sent to the deep learning system. If the user confirms the alert via the alarm input object, the mobile electronic device will immediately transmit the emergency message to the emergency contact. If the timer counts down to zero and the user has not responded, the mobile electronic device can automatically send the emergency message. The current environmental information can include current location information and current audio information used by the deep learning system to correlate current sound data extracted from the current audio information with a current locale associated with the current location information. The risk alert can include a current risk score wherein a low risk score is indicative of relative safety and a high risk score is indicative of relative danger. Multiple emergency contacts can be designated, e.g., a first emergency contact for a low-level risk, a second emergency contact for an intermediate-level risk, and a third emergency contact for a high-level risk, and the emergency message can be sent to a selected one of the emergency contacts depending upon the severity of the current risk score.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Currently no adequate system exists to detect personal danger, and to effectively respond to a situation where people perceive that they are, or suddenly find themselves, in physical danger. While devices are in place that allow a user to initiate a phone call or other transmission when in need of help, these devices are not an option if someone is already being attacked. It would, therefore, be desirable to devise an improved method of personal risk monitoring that could more proactively detect when risky situations arise. It would be further advantageous if the method could effectively rank situations according to risk and possibly take different actions depending on the detected level of risk.

These and other objectives are achieved in various embodiments of the present invention by using deep learning to capture a person's traveling habits, sounds encountered, and schedules kept and, based on real-time assessment, alerting authorities if a situation is deemed to be above a certain threshold (i.e., a danger exists). Based on a scoring assessment of the potential risk indicators, different actions can be taken commensurate with the risk level. The invention may be implemented in part using a mobile electronic device such as a smartphone.

Figure 1:
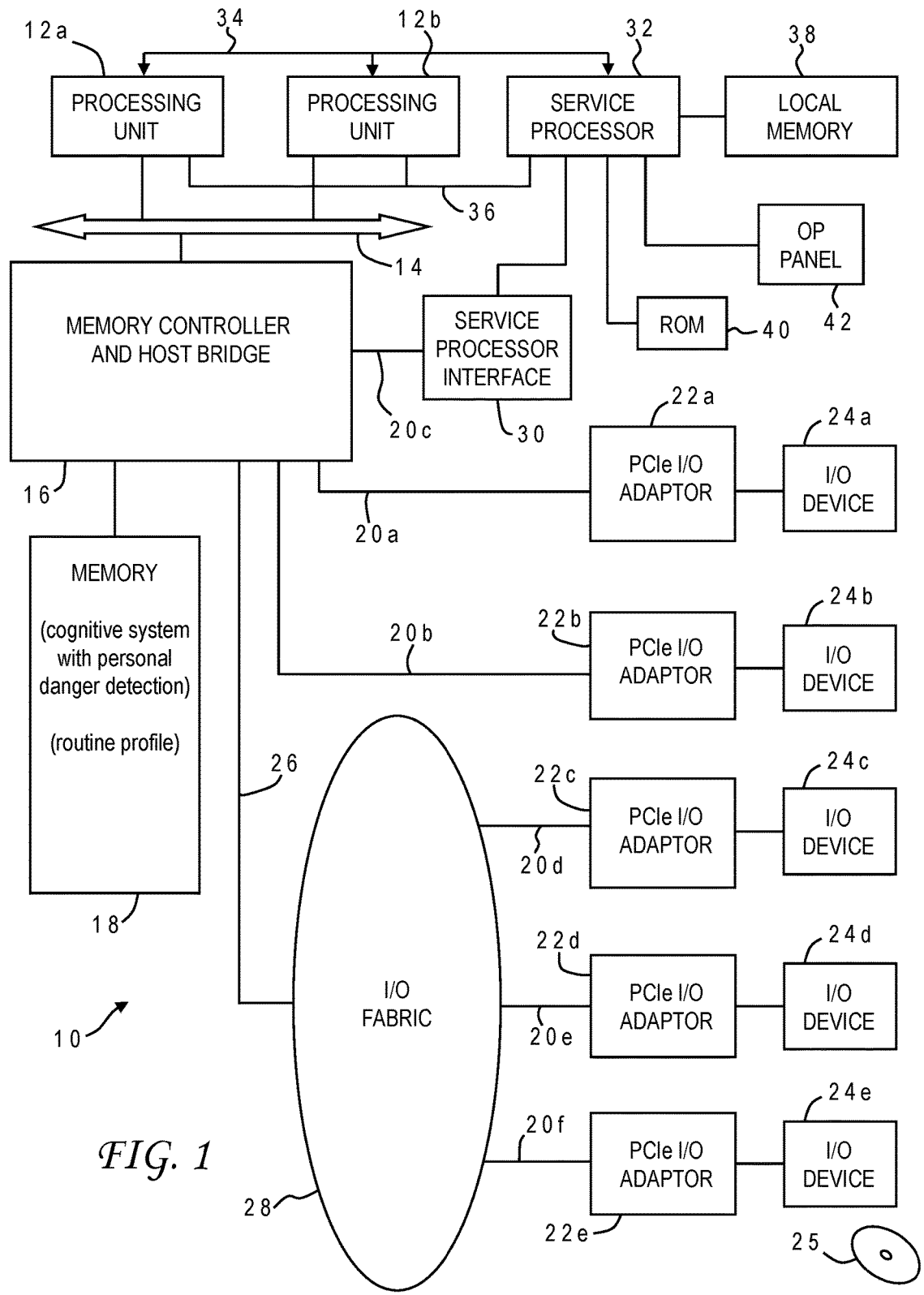
FIG. 1 is a block diagram of a computer system programmed to carry out personal danger detection and response using a deep learning system in accordance with one implementation of the present invention.

With reference now to the figures, and in particular with reference to FIG. 1, there is depicted one embodiment 10 of a computer system in which the present invention may be implemented to carry out personal danger detection and response. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications such as a cognitive system for situational danger detection as well as user routine profiles in accordance with the present invention.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the personal danger detection and response program of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a danger detection process that uses novel deep learning techniques to manage personal risk. Accordingly, a program embodying the invention may additionally include conventional aspects of various deep learning tools, and these details will become apparent to those skilled in the art upon reference to this disclosure.

Figure 2:
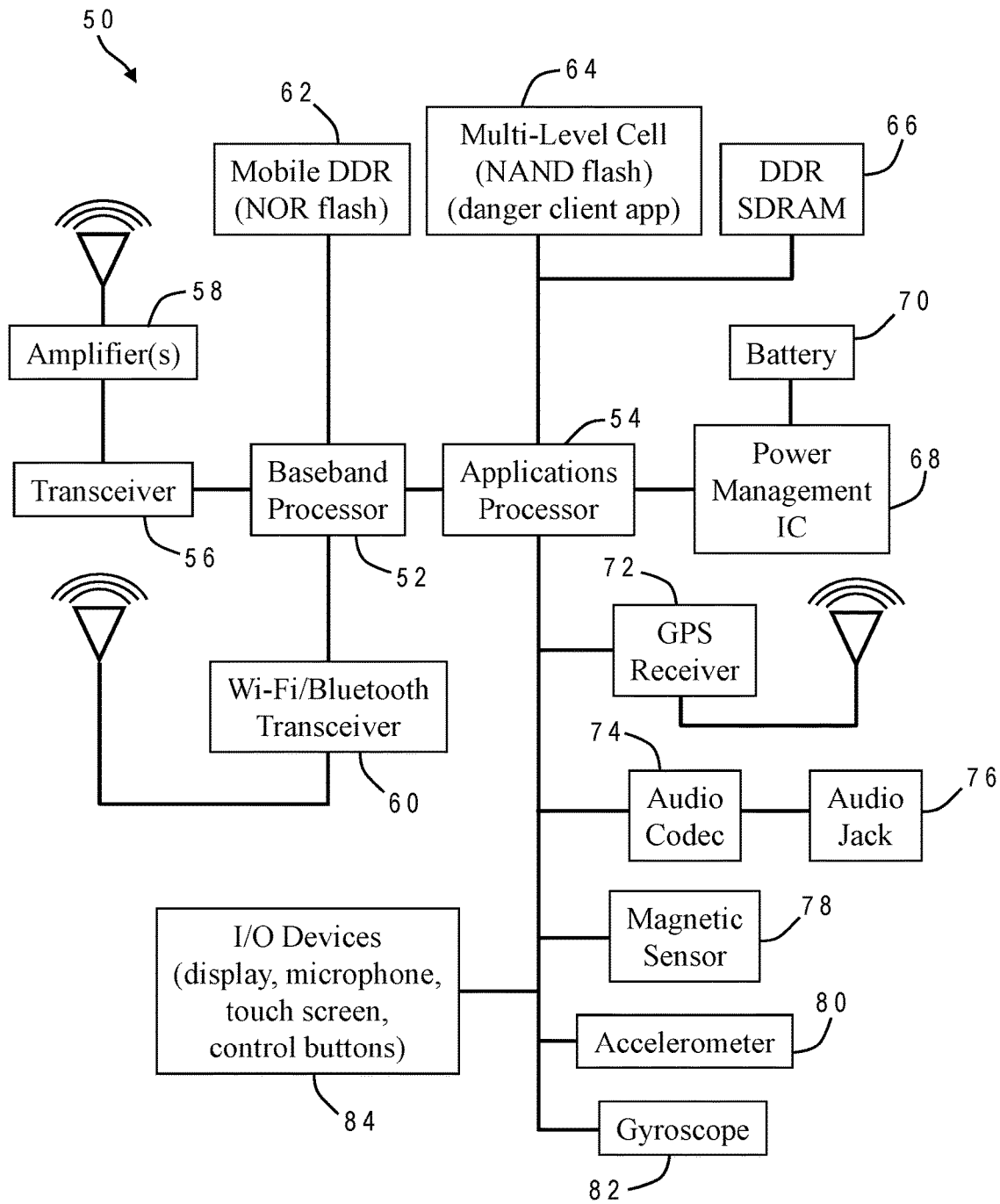
FIG. 2 is a block diagram of a mobile computing device (e.g., smartphone) programmed to carry out personal risk management in accordance with one implementation of the present invention.

Referring now to FIG. 2, there is depicted one example 50 of a mobile computing device or smartphone in which embodiments of the present invention may be implemented to carry out personal risk management by the user. As with computer system 10, alternative embodiments of smartphone 50 may include modifications of the hardware components or their interconnections, or additional components, and other mobile computing devices may be used besides smartphones such as tablets or notebooks, so the depicted example should not be construed as implying any architectural limitations with respect to the present invention. The mobile computing device can also be a vehicle itself having a computerized interface. In this example smartphone 50 includes a baseband processor 52 and an applications processor 54. Baseband processor 52 manages most of the radio (wireless communications) functions of smartphone 50, including communication with a wireless service provider (including Internet transmissions) via a transceiver 56 which is connected by one or more power amplifiers 58 to a network antenna. Baseband processor can also control Wi-Fi and Bluetooth transmissions through transceiver 60 connected to a local antenna. Baseband processor 52 uses a dedicated mobile DDR memory (NOR flash) 62.

Baseband processor 52 essentially acts as an input/output (I/O) device with respect to applications processor 54 which executes the software programs (apps) embodying the invention. Those applications may include one or more programs that can also be carried out by computer system 10. Applications processor 54 preferably utilizes multi-level cell memory (NAND flash) 64 and DDR synchronous dynamic random-access memory (SDRAM) 66. In particular, NAND flash 64 may store a danger client application of the present invention. Applications processor 54 can interact with a power management integrated circuit 68 to control the power supply (battery) 70. Applications processor 54 can additionally receive inputs from a variety of peripheral devices such as a global positioning satellite (GPS) receiver 72 connected to a GPS antenna, an audio codec 74 which drives an audio (e.g., headphone) jack 76, a magnetic sensor 78 for azimuthal indication, an accelerometer 80 for crash detection and aid in crash avoidance, a 3-axis gyroscope 82 for orientation indication, and user I/O devices 84 (e.g., touch screen/display, microphone and control buttons). Smartphone 50 may include many other hardware features not illustrated, for example, a camera and associated driver circuitry.

When smartphone 50 is first turned on, baseband processor 52 and applications processor 54 may perform various tests such as built-in-self-tests or memory tests on the memory components 62, 64, 66. If the systems pass the tests then each processor begins execution of its primary code, namely, a communications link for baseband processor 52 and an operating system for applications processor 54. Once the network communications have been established by baseband processor 52 and the operating system is loaded by applications processor 54, the user can enter appropriate commands via the touch screen or microphone to load executable code representing embodiments of the present invention for execution by applications processor 54. Any or all of the functionalities of computer system 10 can be incorporated directly into mobile device 50 as computing power and memory storage permit.

Figure 3:
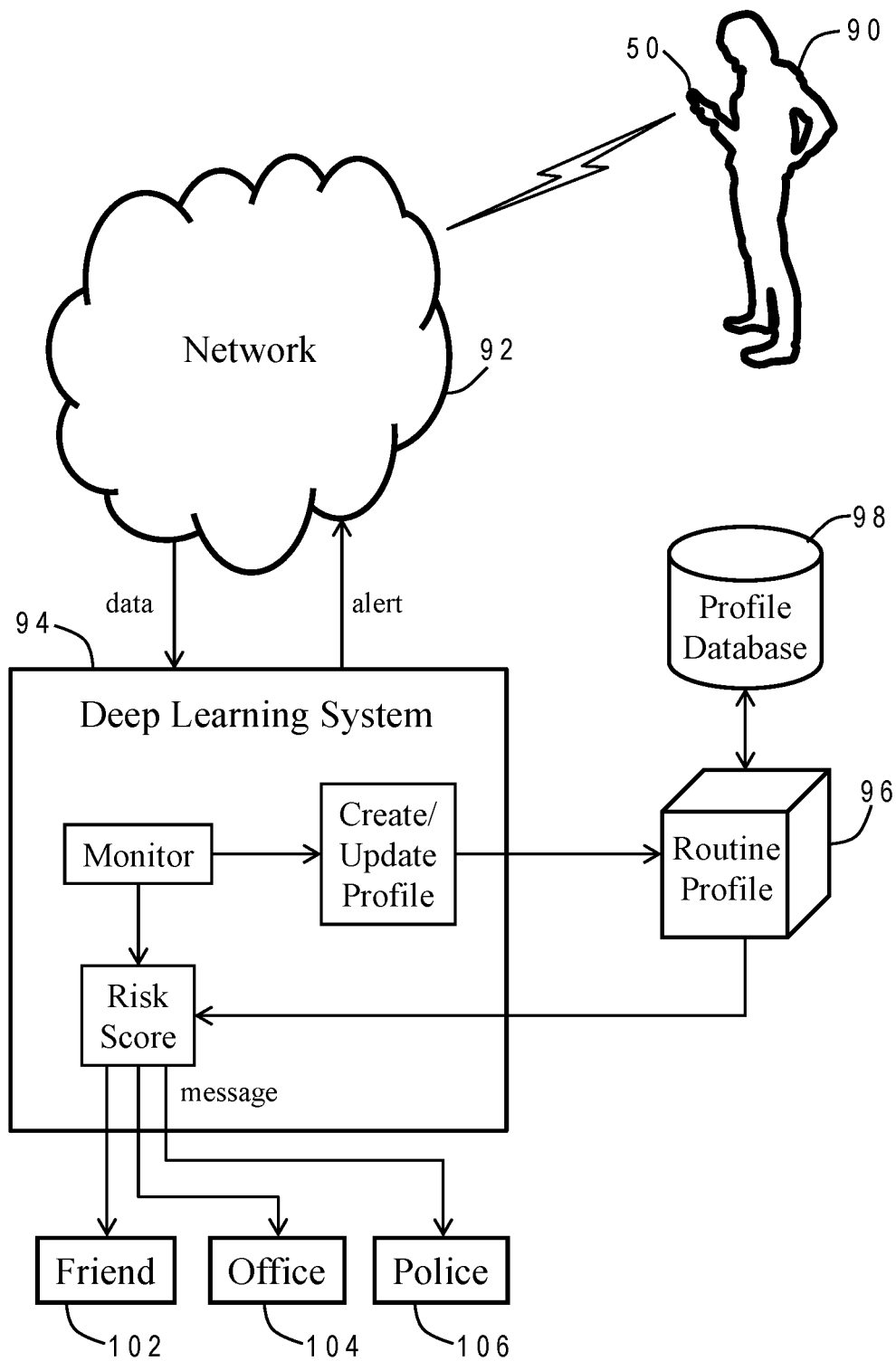
FIG. 3 is a block diagram of a system for detecting and responding to personal danger in accordance with one implementation of the present invention.

FIG. 3 shows a high-level diagram of how the invention might operate according to an exemplary implementation. A user 90 carrying a smartphone 50 is able to communicate interactively with a network 92 which may actually include multiple networks such as a cell phone communications network linked to the Internet. Also connected to this network is a deep learning system 94 which may be running on computer system 10. Deep learning system 94 can include a monitoring service which intermittently receives data from smartphone 50. The data can include location information, audio information, and other information such as biometrics like the user's heart rate, blood pressure, etc., which may be provided via smartphone 50 using additional implements not shown, such as a fitness wrist strap or other wearable device which operatively connect to smartphone 50 via a Bluetooth wireless link. These and other data, such as data from accelerometer 80 (FIG. 2), may be transmitted by smartphone 50 using a suitable app running thereon, i.e., the user can manually activate the app or it can be automatically set to run each time smartphone 50 is powered on. The smartphone app has an appropriate user interface to enable the various functions described herein, including one or more input objects which can be displayed on a touchscreen of the smartphone. As the monitor collects this data it is input into deep learning system 94 to allow it to establish ground truths from extracted features. External ground truths may also be utilized. This learning may be supervised or unsupervised. For example, machine learning applied to the "normal" sounds encountered by a person allows the system to determine the source (origin) of ambient sounds by training the system (using known sounds). In other words, the deep learning could learn that certain sound encountered by the person were from a subway train, leaves falling, the sounds of shoes in a store, a car passing by, etc., and differentiate those from sounds of unknown origin, like a muffled scream, or the sounds from the interior of a car that is not one the person has ridden in or where training data does not exist. Training can take place over a specified period of time where sounds, locations and patterns are recorded. In one example, the training can take place over a period of a week, or longer, to record the user's regular daily pattern. The cognitive system can still act as a safety monitor while in training mode, i.e., continuous or intermittent transmitting of all activities to a server just in case a danger presents itself during the training session.

Deep learning system 94 can use the collected data to create and occasionally update a routine profile 96 for user 90. Routine profile 96 may be one of many routine profiles for different users which can be stored together in a profile database 98. In some implementations, a default routine profile can be used initially until the empirical profile data is available. A user could enter some information initially based on a questionnaire from which system would make assumptions, e.g., if a user were interested in physical fitness, then a gym would be considered a safe locale. The system can also allow the user to categorize current activity in real-time. This would aid the learning process as well as allow the user to specify deviations from normal activity. Alternatively, when deviations are detected the system can prompt the user for an explanation before calculating a risk factor or generating an alert. The system can thereby learn a person's "normal" routines in various terms such as the GPS locations of where the person travels and at what time, what sounds are typically encountered (correlating the GPS locations to the sounds), ranges of acceleration, velocity, or temperature, and other metrics from IoT ("Internet of Things") devices. This data may be used in conjunction with other known information (e.g., available from navigational software and the like) to determine particular locales and possible features for those locales. For instance, a routine may provide an indication that a user shops at a particular grocery store on certain days, or that she has an elevated heart rate (from exercise) during certain times of the day, etc.

Figure 4:
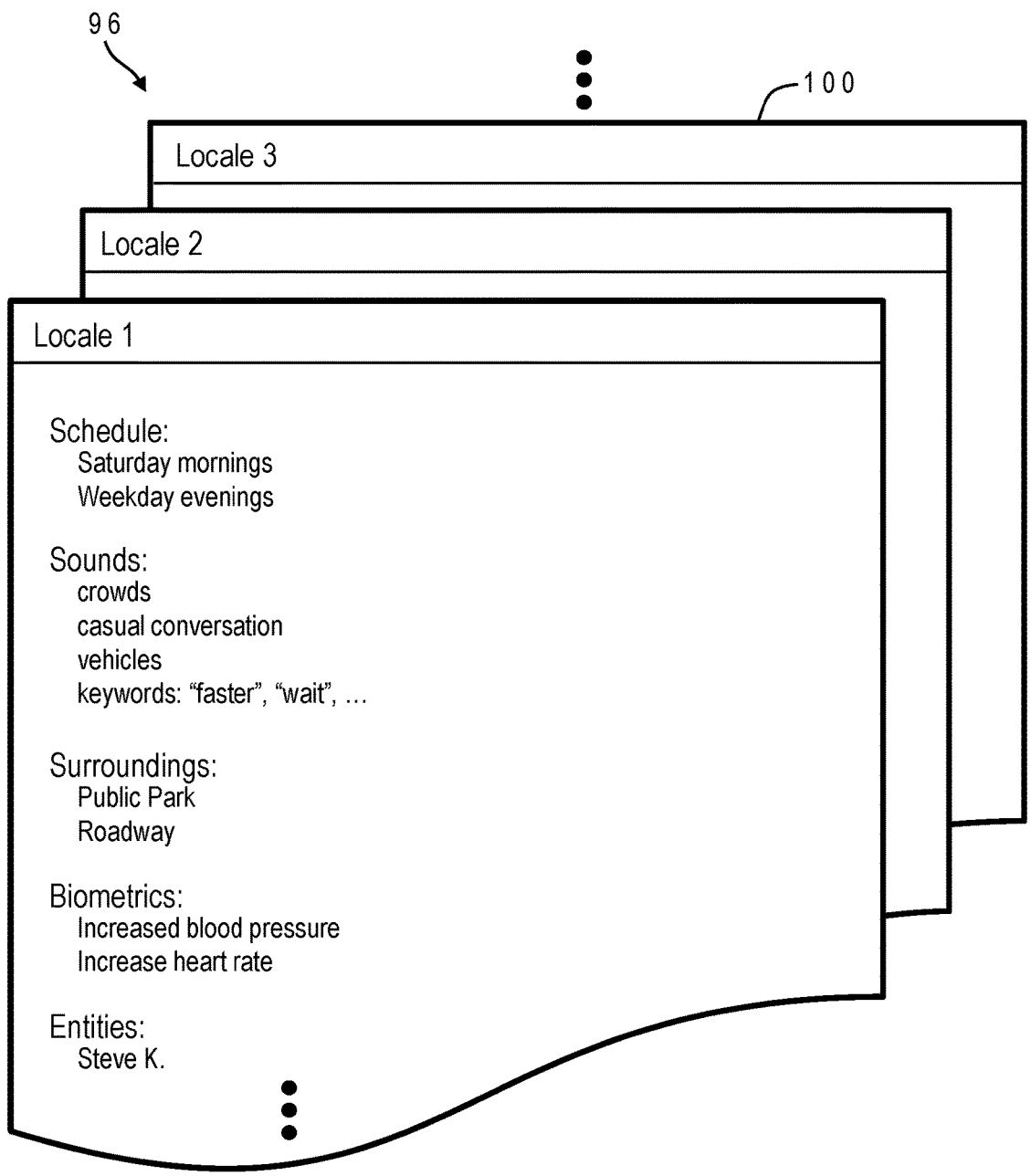
FIG. 4 is a pictorial representation of an exemplary routine profile of a user in accordance with one implementation of the present invention.

One example of a routine profile is seen in FIG. 4. The information in a routine can be thought of as a plurality of entries 100 for different locales previously visited by the user. For each known locale, correlated information can include scheduling (days of the week, days of the month, certain hours in a day, holidays, etc.), sounds from various sources encountered at the locale, surroundings or other features of the locale, biometrics of the user while at this locale, and entities that may be encountered at the locale. In the example of FIG. 4, the deep learning system has learned that the user is often at a certain locale (Locale 1) on Saturday mornings and weekday evenings. Sounds encountered include crowd noise, casual conversations, and vehicles. Map aids inform the system that the surroundings at this GPS location include a public park (where the user is jogging) and a nearby roadway. Biometrics show increased blood pressure and increased heart rate predominates for this locale. The user also often encounters someone named "Steve K." at this location (a jogging buddy determined from recorded conversation). This particular locale thus represents part of the user's exercise regimen. Other aspects of the user's life routine are similarly represented for other locales in routine profile 96.

Returning to FIG. 3, once a user's routine profile is available, it can be used by deep learning system 94 in conjunction with the monitoring of current data from smartphone 50 to generate a risk score. The score can be generated continuously in the sense that it is performed repeatedly with short intervals between assessments. Data can be considered current according to designer preferences; for example, the current data may include data collected during the past hour. Deep learning system 94 looks for departures from the norm established by routine profile 96, whether those are (i) locations traveled, (ii) sounds heard, (iii) acceleration endured, (iv) biometric data, (v) entities encountered, etc., i.e., anything that is statistically different from how the system was trained. The risk score might be low if only one of these metrics deviated significantly (e.g., travel to a new destination), and might be higher if two or more metrics occurred simultaneously (e.g., travel to a new destination late at night and encountering loud noises). Thus, each metric can contribute to the risk score.

Various implementations of the present invention can utilize more advanced features in the generation of the risk score. The system can additionally check for potential risks at new locations based on an assumed risk level for the type of locale. The cognitive system could be familiar with areas where crime has occurred. For example, going to a public room on a college campus or to a public restaurant would generate a low risk score, while going to a private residence or an unpopulated area (warehouse, park, woods, etc.), especially late at night, would generate a high risk score. The sound information can be analyzed for voice data according to conventional means to provide a speech input which can be evaluated for specific keywords, volume, and the nature of the exchange. Words like "no", "stop" and "help" from the owner of the phone or others nearby, words of threat, or cursing from others in the area would generate high risk scores. Some words like "thank you" indicating a comfortable demeanor might lessen the risk score. Natural language processing techniques can be used to classify particular intent aspects of the speech, such as sentiment, tone and emotion. Time of the day and day of the week can be a factor. In an example of a student, during the week, a high risk score might occur if the student was far from the campus or dorm, late at night. The system can be linked to the user's calendar, and detect deviations from the prescribed schedule. Information from the accelerometer indicating a sudden move, fall, or high speeds in conjunction with the above information would increase the risk score. For example, if a phone were discarded this could result in detection by the accelerometer signal of being thrown, then sudden zero movement, which might set of loud alarm and a message such as "Possible abduction, check surroundings." Galvanic skin sensors could be used to measure the user's stress level. In a still more advanced implementation, deep learning system 94 can check other sources like social media to correlate external risk factors with the user, as discussed further below in conjunction with FIG. 6.

The risk score (danger probability) generated by deep learning system 94 can be compared to one or more predetermined thresholds to characterize potential danger and take different actions. In the illustrative embodiment, if the risk score exceeds any of the particular threshold values, then deep learning system 94 sends a risk alert to smartphone 50 to be processed by the danger client app. Additionally, smartphone 50 and/or deep learning system 94 will send an emergency message to a selected contact depending upon which threshold is exceeded. This message may be sent immediately or after a short period to allow the user to cancel the perceived risk, as explained below in conjunction with FIG. 5. For example, if a low risk threshold is exceeded then a message can be sent to a friend 102, while if an intermediate risk threshold is exceeded then a message can be sent to a business contact 104, and if a high risk threshold is exceeded then a message can be sent to an emergency service such as the police 106 or other law enforcement or emergency services. Alternatively, a lowest risk might just transmit information to a server to be accessed later if risk increases to avoid loss of critical information. If the smartphone has no signal (not able to communicate with the cellular network), information can be held in the phone and transmit when a signal is available. Signal strength might be evaluated and small bursts of information sent to avoid failed messages.

Further to this example, the deep learning system might generate a risk score in a range of 0-100, meaning a score of zero is considered very safe (e.g., totally within all norms, perhaps the user is a home) and a score of one hundred is considered imminent life-threatening danger (such as currently under physical attack). The low risk threshold could be 30, the medium risk threshold could be 45 and the high-risk threshold could be 60. Of course other gradations can be provided, with a variety of possible actions taken via smartphone 50, and specific threshold values can be predetermined according to designer preference. The emergency message can include a simple statement indicating the user's identity and/or phone number, the severity of the emergency, and help needed. The message can also include other information like GPS coordinates of the user or recording of sounds currently encountered and any special information regarding the user that may be germane to the situation.

Figure 5:
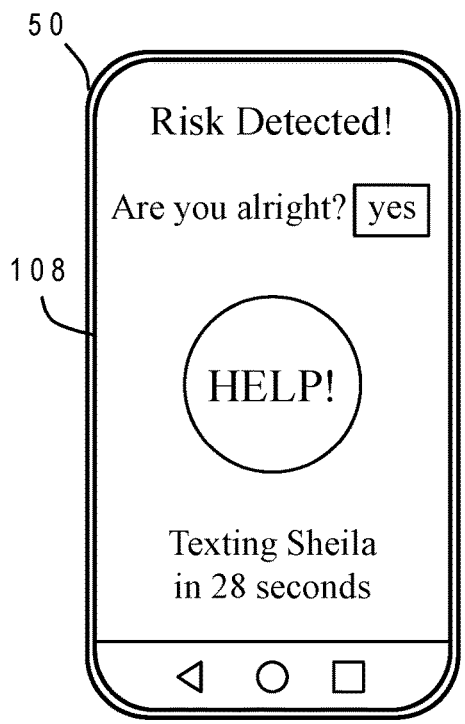
FIG. 5 is an elevational view of a smartphone display depicting an alert screen in response to detection of risk in accordance with one implementation of the present invention.

The danger client app on smartphone 50 can initiate a safety/alarm confirmation process once it receives the risk alert from deep learning system 94. As shown in FIG. 5, this process can include smartphone 50 generating an alert screen on a display 108. In the illustrative implementation the alert screen includes a statement such as "Risk Detected!" indicating that a risk or other danger has been detected, prompting the user to take further action. The alert screen preferably also includes a warning that a message is about to be sent to an emergency contact subject to a countdown timer of, e.g., thirty seconds. The alert screen might further have a question such as "Are you alright?" with an associated safe input object such as a "yes" button shown on the alert screen. If the alert is a false alarm, the user can depress the "yes" button to indicate the situation is safe (a cancel command), which will cancel the alert by removing the alert screen from display 108 and sending a cancel signal from smartphone 50 to deep learning system 94 whereupon deep learning system 94 will also cancel the alert, i.e., not take any further action such as sending the emergency message. Deep learning system 94 can optionally use the currently collected information from smartphone 50 to update the user routine profile in the hopes of avoiding such false alarms in the future. The deep learning system or other host system can be programmed to disregard any cancel signal if the risk score is particularly high (e.g., more than 90 for the above example of a risk score between 0-100), regardless of whether the user pressed the "yes" or "help" button. Additionally, a safety feature may be provided to avoid defeating an inappropriate cancelling of the alert. One option is a password that if entered incorrectly will give the user a message that the alert was cancelled even if it was not. Other cognitive solutions may be implemented, such as asking for password but actually requiring a fingerprint.

If the "yes" button on the alert screen is not depressed by the time the counter gets to zero (for example, if the user cannot reach the smartphone), then smartphone 50 can automatically send the emergency message as indicated by the warning; in the example of FIG. 5, this means sending a text message (SMS) to a previously established contact named "Sheila" (contacts may be established as described below in conjunction with FIG. 9). The alert screen may also include an alarm input object such as a larger "HELP!" button (equivalent to a "no" answer to the safety question). If the "HELP!" button is depressed (an alarm command), smartphone 50 can again take some action. This action might be following through with the emergency message indicated by the warning, or might involve upgrading the response to a higher emergency level by contacting an emergency service such as the police. That contact might also take the form of a text message, or might be a phone call to 9-1-1 with a continual loop of an emergency message in voice form. That call can be directed to a particular designated emergency contact depending upon the severity of the risk score and the settings of the system, which can be user adjustable. Messages can be tailored to the risk score to minimize panic but still generate an appropriate level of response. For example, a low-risk level message may be: "This is a message from Bridget's phone personal security application. Her current status has generated a low risk level, and it is recommended you contact her to confirm she is fine." Then, when contacted, if she does not respond the risk score goes up and will generate additional messages. Additionally, the system can anticipate a response from the emergency contact and, if there is no response, the system may then default to other contacts, such as "commonly used" phone numbers to reach someone else who can help.

When engaging the call feature, relevant information will be continuously streamed, texted, and/or emailed to the contact parties, such as GPS information. In addition, other environmental information can be captured via sound recording as well as video recording from smartphone 50. Information may also be captured from other devices in the area that might be able to communicate with smartphone 50, such as other smartphones, Bluetooth access points, WIFI information, or any device having a unique device identifier such as a media access control (MAC) address. Additionally, devices may be enticed to communicate with smartphone 50 by sending them a probe (request for connection); even if the request is denied, any response will reveal the device's unique identifier. This and other information can be gathered and used to identify device owners near the user who is in danger, in real-time or off-line.

In a more advanced embodiment the present invention is able to anticipate the danger to the user by further understanding the user's possible actions based on external user interactions (i.e., external to smartphone 50) which may be accessible by deep learning system 94. In particular, deep learning system 94 can take into account considerations gleaned from social media, including any social networks the user is part of. These considerations may include events like parties, meetings, engagements, etc. The user might be in an unusual location with circumstances that would otherwise indicate actionable danger, but the system could downgrade it to low risk if known friends of the user were also at that location.

Figure 6:
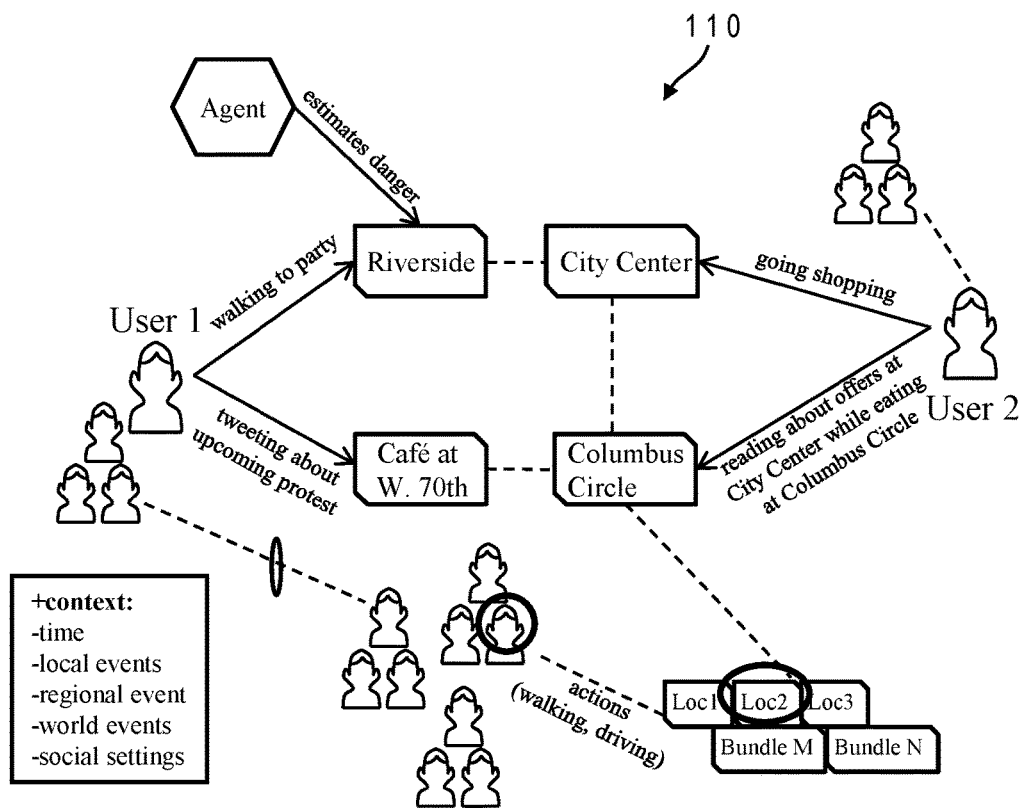
FIG. 6 is a pictorial representation of danger prediction based on social network input in accordance with one implementation of the present invention.

FIG. 6 shows such an example of danger prediction based on social network input. In this example deep learning system 94 has encountered a situation 110 involving two persons, "User 1" and "User 2". Deep learning system 94 is aware that the first user is currently walking to a party at Riverside due to previous posts relating to the party which were provided to the first user via a social media account, such as Facebook, Twitter, Instagram, Snapchat, etc. The changing GPS coordinates of the first user may reinforce that the user is traveling to that destination. While walking to the party, the user is also making a social network posting (such as a "tweet") regarding an upcoming protest that is to occur at a café on West $70^{th}$ Street. The first user has established various social contacts through one or more social networks (e.g., "friends"). Information from those friends may also be accessible by deep learning system 94 through the social network platform. Deep learning system 94 can branch out its data collection to additionally cover other sets of contacts, i.e., friends of friends (e.g., degrees of connectivity). This data collection may show that another person remotely connected to the first user is at a particular location "Loc2" that corresponds to a locale known as Columbus Circle. While all of this data collection and analysis is being performed in relation to the first user, deep learning system 94 can also be collecting information on the second user through similar means. That information may indicate that the second user is planning to go shopping in a shopping district called City Center. This action may be anticipated because the second user is reading about offers available at City Center while eating in a restaurant at Columbus Circle. The information obtained from friends of the first user can be used to estimate the risk score of that or other users depending on whether they are at or moving towards locations mentioned in the social conversations. The system might also generate one or more non-alarming messages on social media, similar to Amber Alerts seen on highways. For example, the system might solicit questions like "When did you last see Bridget and where?". The cognitive system can take this input to put together a map of her most recent activities.

Offering this invention as a service greatly increases the capability of the cognitive system. The learning algorithms can use the anonymized experiences of other users to train a central knowledgebase. Now if a user goes into a locale new to them, the system may already have risk data expected behavior for the location. For example, if the users goes to a new gym, or a jogging park. The system can also aggregate biometric responses from co-located users to identify risks associated with crowds.

One algorithm that is useful in tracking and predicting actions based on a user's context is known as noise-tolerant time-varying (NTT) graphs. The NTT algorithm is a known method of modeling dynamic systems. Using this method, deep learning system 94 can calculate the likelihood of a dangerous action being triggered by the social network based on a number of parameters (context) such as, location, time, number of connections, recent actions, recent postings, recent purchases, published photos, social network connections and their profiles, etc. The NTT algorithm may be modified for use with the present invention by defining an attribute matrix wherein each row corresponds to a user and each column corresponds to an attribute. Attributes may be items such as "walks alone", "avoids busy highways", "walks with headphones on", "takes last bus home", "accessed pattern that uses action A", etc. (can be multivariable). An attribute augmented network can be defined based on, for example, the set of users, a set of links between users at any given time, and a set of routes. Action tracking is then achieved by learning a mapping function that maps the attribute augmented network to the action history of a user. A user's actions at any given time t can be influenced by other users' (within the primary user's social network) actions at time t, possibly limited to related routes or other conditions. A user's actions may also be dependent on previous actions. Actions of multiple users can have a strong correlation. The output of the algorithm is a set of predicted dangerous actions/paths.

Figure 7:
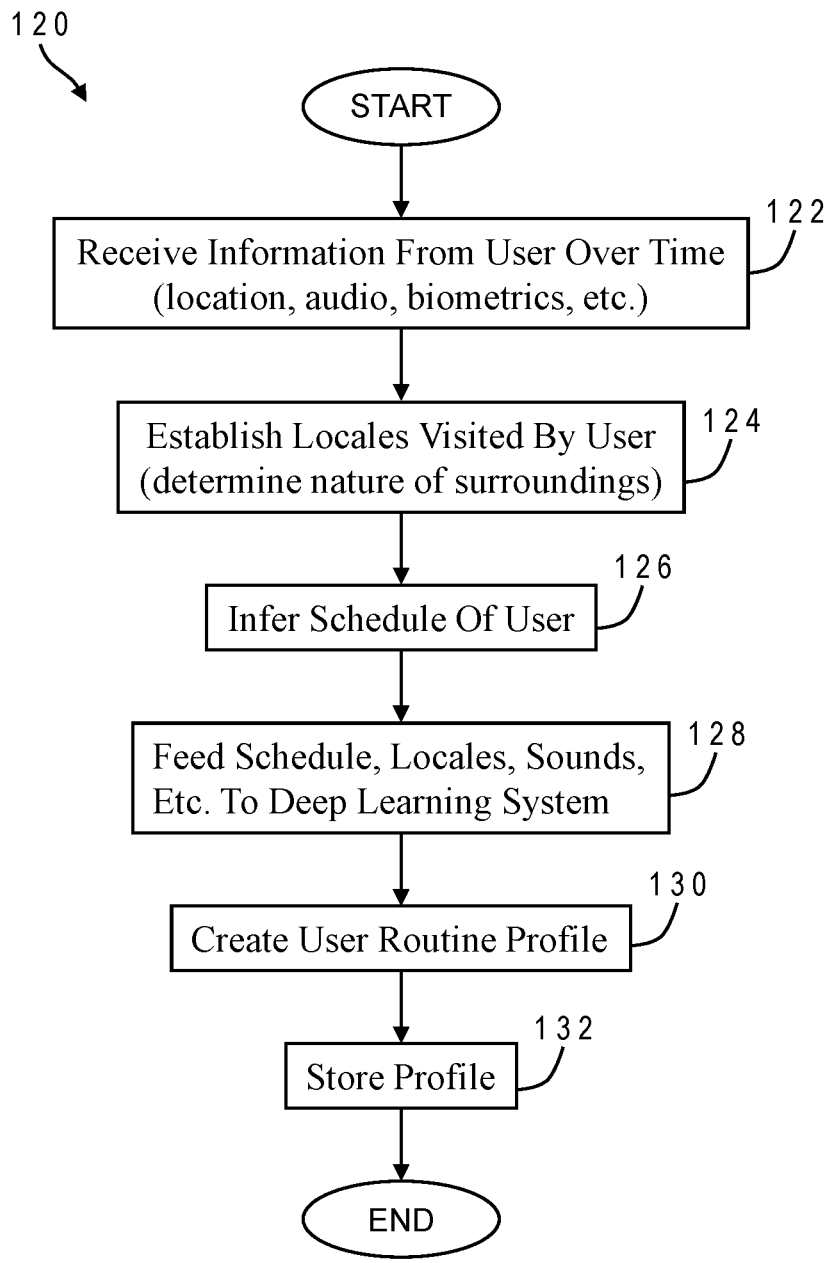
FIG. 7 is a chart illustrating the logical flow for a process of training a deep learning system used for detection of personal danger in accordance with one implementation of the present invention.
Figure 8:
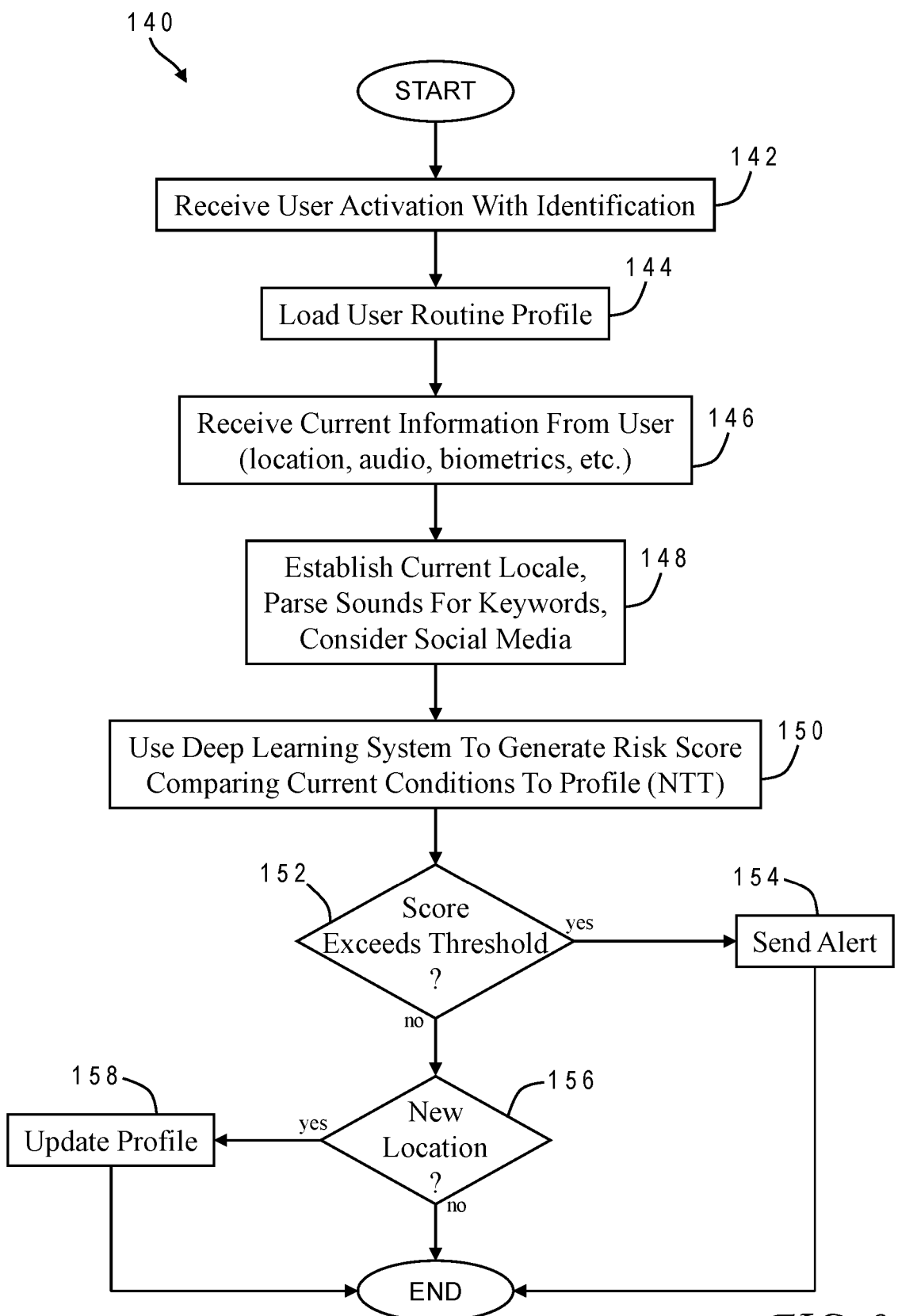
FIG. 8 is a chart illustrating the logical flow for a process of detecting and responding to personal danger using a deep learning system in accordance with one implementation of the present invention.
Figure 9:
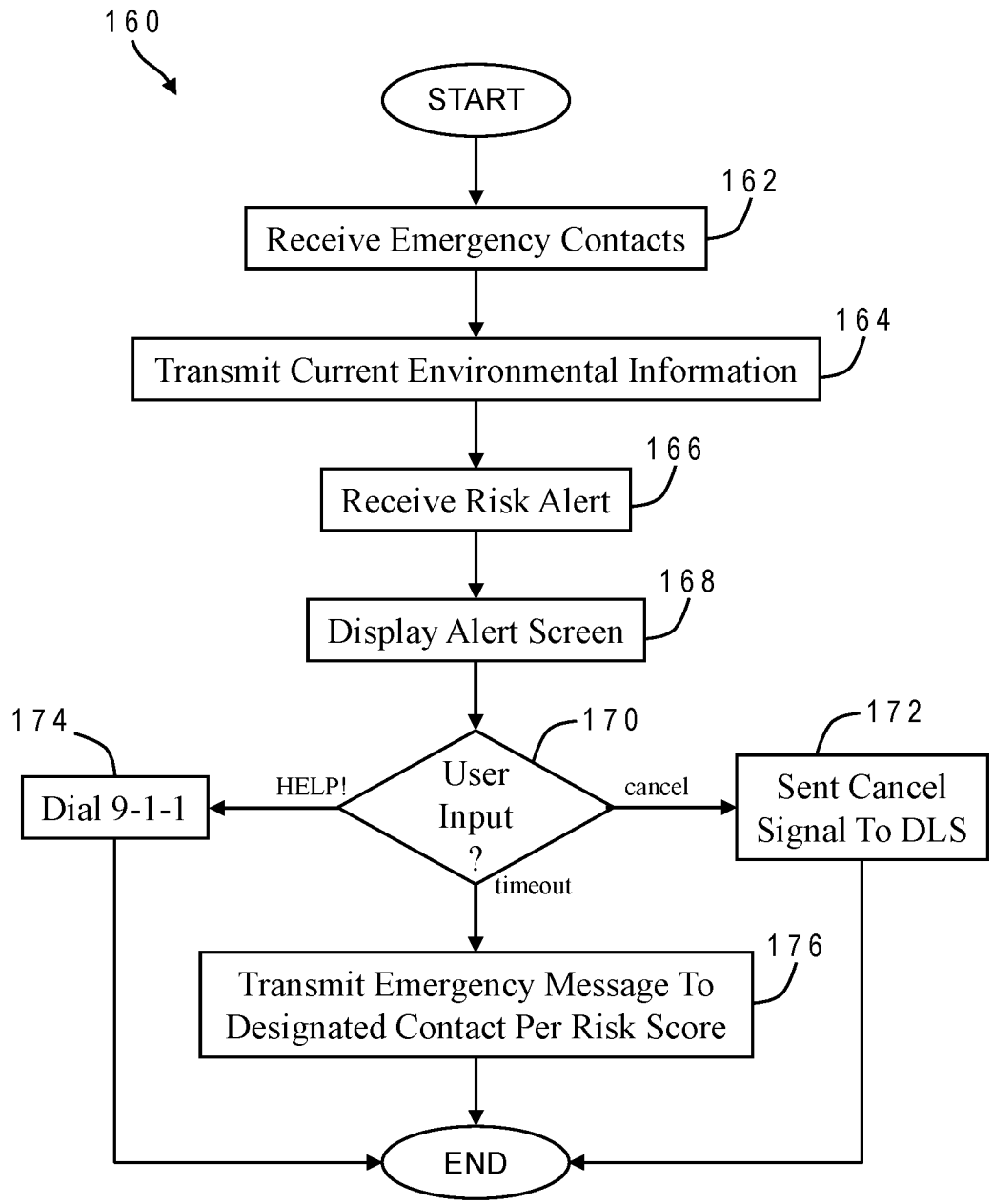
FIG. 9 is a chart illustrating the logical flow for a process of risk management using a mobile communications device such as a cellphone in accordance with one implementation of the present invention.

The present invention may be further understood with reference to the charts of FIGS. 7-9 which illustrate different processes involved in carrying out the invention according to various implementations. FIG. 7 shows a training process 120 for the deep learning system. Training process 120 begins with computer system 10 receiving information from the user over time, via the mobile electronic device (122). The information may include among other things location, audio, and biometrics. The computer system uses this information to establish locales visited by the user (124), and infer a schedule of the user (126). The schedule, locales, sounds, etc., are then input to the deep learning system as ground truths (128). The deep learning system correlates this information to create a user routine profile (130). The profile may be stored in a profile database for later use (132).

FIG. 8 depicts a risk detection process 140 carried out by computer system 10. Risk detection process 140 begins by receiving a user activation of the risk detection system from a remote user (142). The activation signal is received from the user's mobile electronic device via the communications network, and includes identifying information for the user. The user may be required to previously subscribe to the service. Using the identifying information, a specific user routine profile for this user is loaded (144). The profile may be provided from the profile database and correlated to the user via any convenient identifying criteria such as the user's name, a pseudonym, the MAC address of the mobile electronic device, or an assigned identification number. The computer system proceeds to gather current information from the user including without limitation location, audio and biometrics (146). A current locale is established for the user based on the location information, and the audio information is parsed for any keywords (148). Additional information relevant to the user's current activities may be obtained from social media. The deep learning system is then used to generate the risk score, by comparing current conditions to the user profile (150). This comparison may include the NTT analysis. If the risk score exceeds a predetermined threshold (152), an alert signal is sent to the user's mobile electronic device (154). The alert signal can include the risk score to be used by the smartphone to select a particular emergency contact. If the threshold is not exceeded, the current location can be examined to see if it is a new location (156), and the user's routine profile can be updated based on current information (158).

FIG. 9 illustrates a risk alert process 160 performed by smartphone 50 or other mobile electronic device carried by the user. Risk alert process 160 begins by the user designating one or more emergency contacts (162). There is no limitation on the nature of these contacts, and they can be persons or automated services. Contact information is provided for each emergency contact. Contact information may take any form which is conducive to electronic communications including but not limited to a phone number, email address, or account information for a messaging service account such as Facetime, Skype, or Messenger. Contact information is entered via the previously mentioned user interface for the danger client app running on the smartphone. Contact information may also be read from other apps residing on the smartphone. A default emergency contact may be provided by the app, such as 9-1-1. Emergency contacts need not be aware they have been designated in this manner, although there may be a feedback mechanism so they can formally accept this responsibility, and possibly provide additional information. A feedback response could for example confirm that a particular locale is appropriate.

Current environmental information including GPS coordinates, sounds, biometrics, etc., is intermittently sent over the communications network from the smartphone to the facility housing the deep learning system (164). The smartphone app remains in this monitoring/transmission state until a risk alert signal is received from the deep learning system (166). In response to the risk alert, the smartphone app will generate an alert screen on its display (168). The alert screen can include the warning about tentatively sending an emergency message, as well as the safe input object to cancel the alert, and the alarm input object to immediately transmit the emergency message. The smartphone app then waits for a user response to the alert (170). If the user cancels the alert, a cancel signal is sent to the deep learning system (172), and the alert screen is removed from the display. If the user hits the alarm, the smartphone immediately dials 9-1-1 (174). If the user does not provide any input by the time the alert counter reaches zero, the smartphone will transmit a message to the particular emergency contact designated according to the risk score, e.g., low/medium/high (176).

The present invention in its various implementations thereby achieves improved personal protection in terms of situational danger detection and response. The use of a deep learning system not only imparts superior analysis of current information versus a user's routine, but also allows continuous improvement of this analysis by updating the user profile not only based on new locales but also in response to user inputs regarding previous alerts. This approach provides a proactive solution which may in many cases prevent a person from ever experiencing an actual dangerous situation. The system can further act to help prevent problems for others by sharing information across multiple users. The method still offers flexibility in deployment by allowing the user to designate different recipients depending upon perceived risk, so a call does not have to be made to the police in all situations, providing better management of risk. This application is also useful for bullying detection and communication to appropriate authorities.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the comparison of a risk score to multiple thresholds allows the system to take many different actions, not just send messages. One such action might be automatically activating a taser function built into a smartphone. It is therefore contemplated that such modifications can be made without departing from the spirit or scope of the present invention as defined in the appended claims.

What is claimed is:

1. A method of responding to personal danger using a mobile electronic device comprising:
   receiving at the mobile electronic device a designation of at least one emergency contact for a user of the mobile electronic device;
   transmitting current environmental information from the mobile electronic device to a deep learning system having a routine profile of the user, wherein the deep learning system creates the routine profile through training over a period of time by recording historical environmental information including sounds, locations and patterns associated with the user;
   receiving at the mobile electronic device a risk alert from the deep learning system indicative of personal danger based on the current environmental information as compared to the routine profile; and
   in response to said receiving of the risk alert, generating an alert screen on a display of the mobile electronic device wherein the alert screen includes an alarm input object and a safe input object, the alarm input object allowing the user to immediately transmit an emergency message to the emergency contact, and the safe input object allowing the user to cancel the risk alert.

2. The method of claim 1 wherein the alert screen further includes a warning indicating the emergency message is to be transmitted to the emergency contact when a timer countdown reaches zero.

3. The method of claim 1 wherein the current environmental information includes current location information and current audio information used by the deep learning system to correlate current sound data extracted from the current audio information with a current locale associated with the current location information.

4. The method of claim 1 further comprising:
   receiving a cancel command from the user via the safe input object; and
   responsively removing the alert screen from the display of the mobile electronic device and sending a cancel signal to the deep learning system.

5. The method of claim 1 further comprising:
   receiving an alarm command from the user via the alarm input object; and
   responsively transmitting the emergency message to the emergency contact.

6. The method of claim 1 wherein the risk alert includes a current risk score, a low risk score being indicative of relative safety and a high risk score being indicative of relative danger.

7. The method of claim 6 wherein the emergency contact is a first emergency contact for a low-level risk and further comprising receiving at the mobile electronic device designations of a second emergency contact for an intermediate-level risk and a third emergency contact for a high-level risk, wherein the emergency message is selectively sent to one of the first, second or third emergency contacts depending upon a severity of the current risk score.

8. A computing device comprising:
   one or more processors which process program instructions;
   a wireless communications transceiver controlled by said one or more processors;
   a display controlled by said one or more processors;
   a memory device connected to said one or more processors; and
   program instructions residing in said memory device for responding to personal danger by receiving a designation of at least one emergency contact for a user of the computing device, transmitting current environmental information to a deep learning system having a routine profile of the user, wherein the deep learning system creates the routine profile through training over a period of time by recording historical environmental information including sounds, locations and patterns associated with the user, receiving a risk alert from the deep learning system indicative of personal danger based on the current environmental information as compared to the routine profile, and generating an alert screen on the display wherein the alert screen includes an alarm input object and a safe input object, the alarm input object allowing the user to immediately transmit an emergency message to the emergency contact, and the safe input object allowing the user to cancel the risk alert.

9. The computer system of claim 8 wherein the alert screen further includes a warning indicating the emergency message is to be transmitted to the emergency contact when a timer countdown reaches zero.

10. The computer system of claim 8 wherein the current environmental information includes current location information and current audio information used by the deep learning system to correlate current sound data extracted from the current audio information with a current locale associated with the current location information.

11. The computer system of claim 8 wherein said program instructions further receive a cancel command from the user via the safe input object, and responsively remove the alert screen from the display and send a cancel signal to the deep learning system.

12. The computer system of claim 8 wherein said program instructions further receive an alarm command from the user via the alarm input object, and responsively transmit the emergency message to the emergency contact.

13. The computer system of claim 8 wherein the risk alert includes a current risk score, a low risk score being indicative of relative safety and a high risk score being indicative of relative danger.

14. The computer system of claim 13 wherein the emergency contact is a first emergency contact for a low-level risk and said program instructions further receive designations of a second emergency contact for an intermediate-level risk and a third emergency contact for a high-level risk, wherein the emergency message is selectively sent to one of the first, second or third emergency contacts depending upon a severity of the current risk score.

15. A computer program product comprising:
a computer readable storage medium; and
program instructions residing in said storage medium for responding to personal danger by receiving a designation of at least one emergency contact for a user of the computing device, transmitting current environmental information to a deep learning system having a routine profile of the user, wherein the deep learning system creates the routine profile through training over a period of time by recording historical environmental information including sounds, locations and patterns associated with the user, receiving a risk alert from the deep learning system indicative of personal danger based on the current environmental information as compared to the routine profile, and generating an alert screen on the display wherein the alert screen includes an alarm input object and a safe input object, the alarm input object allowing the user to immediately transmit an emergency message to the emergency contact, and the safe input object allowing the user to cancel the risk alert.

16. The computer program product of claim 15 wherein the alert screen further includes a warning indicating the emergency message is to be transmitted to the emergency contact when a timer countdown reaches zero.

17. The computer program product of claim 15 wherein the current environmental information includes current location information and current audio information used by the deep learning system to correlate current sound data extracted from the current audio information with a current locale associated with the current location information.

18. The computer program product of claim 15 wherein said program instructions further receive a cancel command from the user via the safe input object, and responsively remove the alert screen from the display and send a cancel signal to the deep learning system.

19. The computer program product of claim 15 wherein said program instructions further receive an alarm command from the user via the alarm input object, and responsively transmit the emergency message to the emergency contact.

20. The computer program product of claim 15 wherein the risk alert includes a current risk score, a low risk score being indicative of relative safety and a high risk score being indicative of relative danger.

* * * * *